United States Patent
Ungruh et al.

[11] Patent Number: 5,884,461
[45] Date of Patent: Mar. 23, 1999

[54] DISK MOWER

[75] Inventors: Josef Ungruh, Rheine; Hermann Tebbenhoff, Hopsten, both of Germany

[73] Assignee: H. Niemeyer Soehne GmbH & Co. KG, Hoerstel, Germany

[21] Appl. No.: 723,629

[22] Filed: Oct. 3, 1996

[30] Foreign Application Priority Data

Nov. 6, 1995 [DE] Germany .................. 295 17 559.1

[51] Int. Cl.[6] ............................ A01D 75/30; A01D 34/52
[52] U.S. Cl. .................... 56/7; 56/6; 56/255; 56/295; 56/DIG. 17
[58] Field of Search ................... 56/6, 7, 17.1, 16.7, 56/225, 295, 192, 193, DIG. 9, DIG. 21, DIG. 17, DIG. 22, 255

[56] References Cited

U.S. PATENT DOCUMENTS

| | | | |
|---|---|---|---|
| 2,625,784 | 1/1953 | Kelsey . | |
| 4,110,959 | 9/1978 | Oosterling et al. | 56/6 X |
| 4,183,196 | 1/1980 | Oosterling et al. | 56/6 X |
| 4,502,267 | 3/1985 | Klinner | 56/13.6 |
| 4,531,349 | 7/1985 | Ehrhart et al. | 56/6 X |
| 4,686,818 | 8/1987 | Zweegers | 56/6 X |
| 5,463,852 | 11/1995 | O'Halloran et al. | 56/6 |
| 5,600,943 | 2/1997 | Ryan | 56/6 X |

FOREIGN PATENT DOCUMENTS 4401500  1/1995  Germany .

Primary Examiner—Thomas B. Will
Assistant Examiner—Gary S. Hartmann
Attorney, Agent, or Firm—Jordan and Hamburg LLP

[57] ABSTRACT

A disk mower moveable in a cutting direction includes a mower cutter support and a plurality of mowing disks mounted on the cutter support, the mowing disks being aligned in a direction generally perpendicular to the cutting direction. Each of the mowing disks rotate within a working circle having a working circle diameter, the working circle diameter of at least one of the mowing disks being different from the working circle diameter of at least one other mowing disk.

24 Claims, 4 Drawing Sheets

DISK MOWER

BACKGROUND OF THE INVENTION

German 44 01 500 C1 discloses a plate mower with several identical mowing plates which are adjacent to one another in a direction at right angles to the driving direction and driven in groups in the same direction and for which the central mowing plates of adjacent mowing disks are equipped with conveying devices and/or conveying elements. At the same time, the conveying elements, constructed as conveying ramps, have a constant radius which is larger than the small radius of the elliptically constructed mowing plate. The conveying ramps are firmly connected with the mowing plate and the conveying device and are located in the transition region between the large and the small radius of the elliptically shaped mowing plate.

SUMMARY OF THE INVENTION

It is an object of the invention to provide a disk mower with improved conveying of the mowing material in a swath.

An inventive disk mower has two groups of mowing disks which rotate in opposite directions and convey the mowing material to be cut to one another and, with that, form a mowing swath. At the same time, the periphery of the mowing material increases during the conveying from the outer to the inner mowing disks, so that it is necessary to ensure that the disk mower will operate even with large amounts of mowing material without becoming blocked and without forming strips. Pursuant to the invention, this objective is accomplished in a simple manner in that the mowing disks have different working circles, which is accomplished owing to the fact that the longitudinal extent of some mowing plates with a basic elliptical shape is larger in their longitudinal extent. In order, nevertheless, to retain a straight cut of the disk mower, the cutting knives of the mowing disks have identical cutting circles. This results in a further advantage. The projection of the cutting knives of the mowing disks of larger dimension is less. As a result, with larger accumulations of mowing material in the region of these larger mowing disks, the danger that the cutting knife will yield laterally is less while, on the other hand, the cutting effect is not made worse.

In the case of, for example, two groups of similarly revolving mowing disks, the invention provides that the mowing disk in the middle of each group describes an enlarged working circle. In other words, the mowing material conveyed by the outer mowing disk in this direction, has more contact with the larger disk and, as a result, a better conveying effect is ensured. The mowing disk of the group, which is directed to the center of the disk mower, has no additional conveying devices, since in this region the mowing material passes over the mowing disks and is deposited in a mowing swath behind the disk mower.

By means of a particularly advantageous construction of the mowing disks, aside from the enlarged dimension, the conveying behavior can be supported further by the shape of the mowing disk itself. For example, provisions are made pursuant to the invention that, in the outer region of the elliptical mowing disks, notches or the like contribute to this additional conveying.

The outer mowing disks of the groups of the disk mower are provided in a known manner with drum-like conveying elements. Pursuant to the invention, additional catches can be disposed on these conveying elements. Depending on the working width of the disk mower and on the number of mowing disks, the catches can be disposed distributed on one or several drums. Their size and construction depends on the mowing material to be conveyed.

The additional conveying devices in the region of the drum can have different shapes. Due to the higher arrangement relative to the cutting plane, they take hold of the mowing material further towards the top and thus prevent tilting of the stalks.

It is a further significant advantage of the invention that, on the larger mowing disks in the region of the larger longitudinal extent, conveying elements can be disposed which convey and lift up to the mowing material in an intensified manner. These conveying elements preferably are detachably connected with the respective mowing disk. The invention provides that, by re-bolting, mowing plates rotating clockwise as well as anti-clockwise can be equipped optionally with the same conveying elements.

The conveying elements have a ramp region which rises in a direction opposite to the direction of rotation of the mowing disk and form with their leading edge an acute angle with the longitudinal axis of the elliptical contour of the mowing disk. By means of this inclination to the longitudinal axis of the mowing disk, an additional, strong conveying effect in the direction of the mowing swath is produced, and at the same time, the mowing material is raised in order to provide the cutting knives with adequate free space for cutting the Mowing material.

In plan view, the outer contours of the conveying element correspond essentially to the adjacent, outer contour of the mowing disk and terminates with this. This is important for the satisfactory cutting of the mowing material in this region The invention furthermore provides that the outer end point of the leading edge of the conveying element in the direction of the rotation of the mowing disk leads the inner end point. This end point and the ramp of the conveying element should be disposed essentially in the region of the Width of the cutting knife of the mowing disk in order to have a particularly effective action.

Each larger mowing plate, like the remaining mowing plates, is equipped with two cutting knives. The larger mowing plates can each be equipped with two conveying elements.

The invention provides that, between the outer mowing disks of each group, which are equipped with drum-like devices, in each case one transfer device is disposed, which largely closes off the space between the drums and above the cutting plane for the mowing material. By these means, the transfer of the mowing material from the outer to the adjacent mowing disk is improved and no mowing material can be passed between the drums of the mowing disks.

The advantages of the invention can also be employed for disk mowers which are to be attached to the front or tractors.

Further distinguishing features and advantages of the invention arise out of the following description and the drawings, in which an example of an inventive disk mower is shown diagrammatically.

DESCRIPTION OF THE PREFERRED EMBODIMENTS

Figure 1:
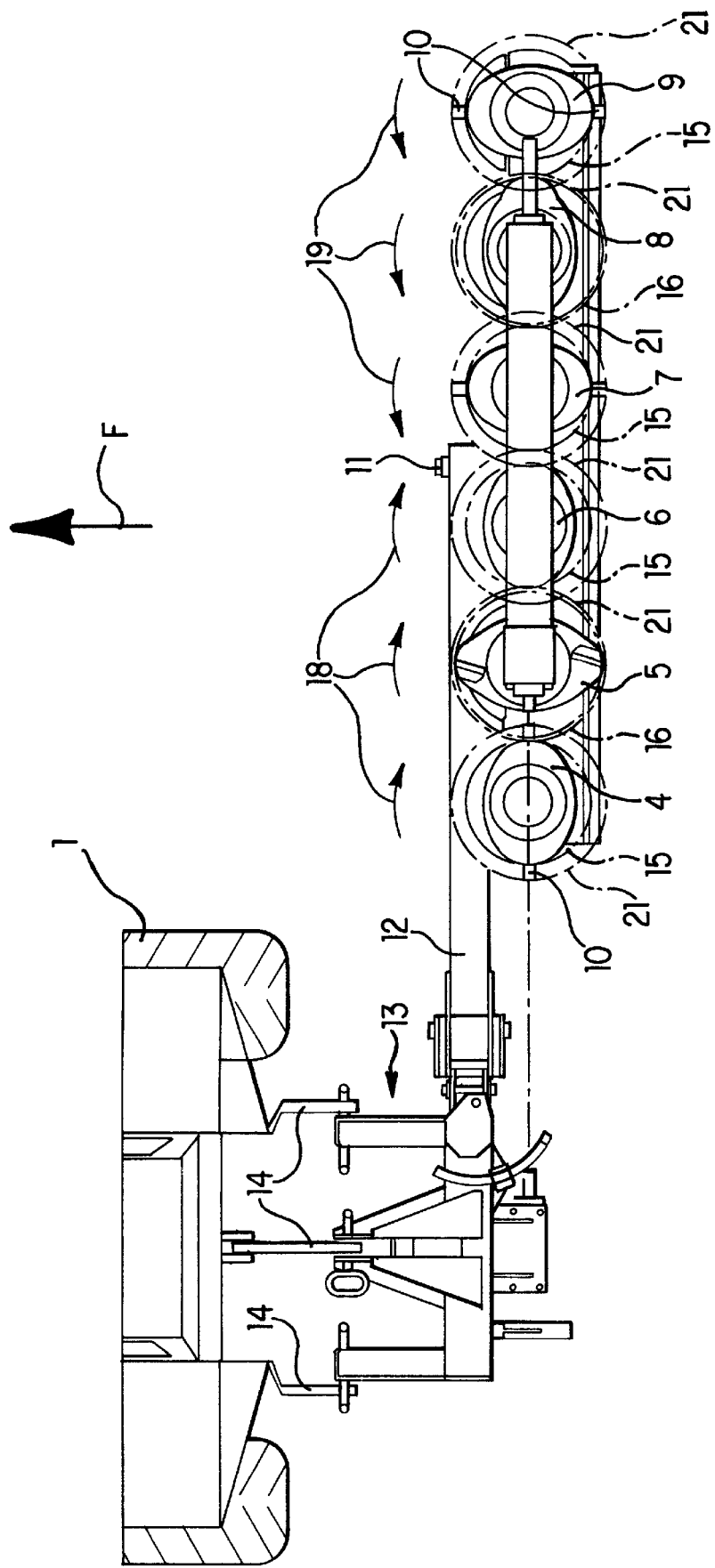
FIG. 1 shows a disk mower, which is to be attached to the rear of a tractor, in the working position in plan view.
Figure 2:
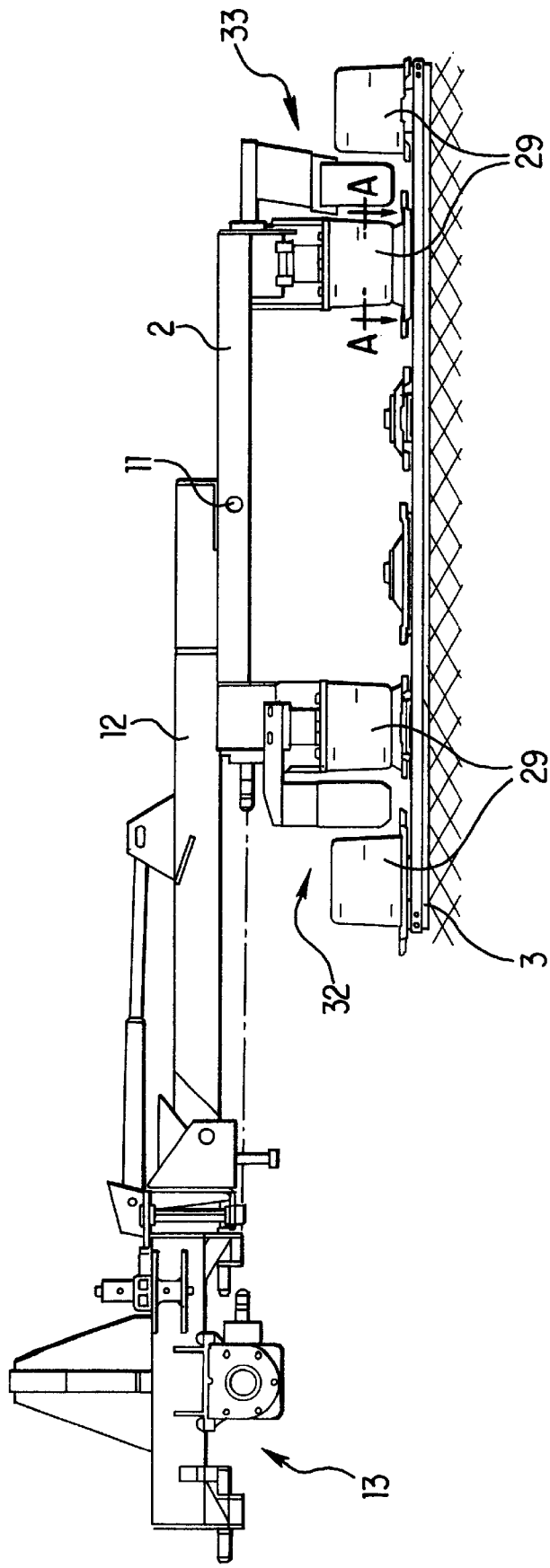
FIG. 2 shows the disk mower of FIG. 1 in a view in the driving direction.

A rear disk mower is shown in the working position as an example of the inventive. It is pulled in the driving direction F by a tractor 1 (FIGS. 1; 2). Details unessential for the invention have been omitted from the drawings. Mowing disks 4, 5, 6, 7, 8, 9, rotated by the power take-off of the tractor, are disposed next to one another on a mower cutter bar 3 and equipped in each case with two cutting knives 10. Together with a supporting frame 2, the cutter bar 3 forms a unit, which is hinged to an extension arm 12 so that it can swivel about a swiveling point I 1. The extension arm 12 is the connection to the supporting trestle 13 which connects the disk mower over a 3-point rod assembly 14 with the tractor 1.

According to the example, some mowing disks 4, 6, 7, 9 are of equal size and therefore describe the same working circles 15. Other mowing disks 5, 8 are larger in their longitudinal extent 17 and describe a larger working circle 16.

The mowing disks 4, 5, 6, 7, 8, 9 are divided into two groups with respect to their direction of rotation, namely into clockwise-rotating 18 mowing disks 4, 5, 6 and counter-clockwise-rotating 19 mowing disks 7, 8, 9. These groups, rotating in opposite directions, convey the mowing material toward the center of the disk mower where it is passed over mowing disks 6, 7 and, at the same time, forms a mowing swath.

According to the example, the central mowing disk 5, 8 within each group of mowing disks rotating in opposite directions, is constructed in each case in this dimension, so that it describes a larger working circle 16, which results in an additional conveying effect on the mowing material.

With respect to the direction of rotation, the mowing disks 4, 5, 6, 7, 8, 9 are divided into two groups, namely into mowing disks 4, 5, 6 rotating clockwise 18 and mowing disks 7, 8, 9 rotating anti-clockwise 19. These groups, rotating in opposite directions, convey the mowing material to the center of the disk mower, where it is passed over mowing disks 6, 7 and, at the same time, forms a mowing swath.

According to the example, the dimensions of the central mowing disk 5, 8 within the group of mowing disks, rotating in opposite directions, are such that they describe a larger working circle 16 which results in an additional conveying effect on the mowing material.

The cutting circle 21 of the cutting knives 10 of the mowing disks 4, 5, 6, 7, 8, 9 is the same. The effective cutting length 20 of the cutting knives 10 is, however, smaller for the larger mowing disks 5, 8 than for the remaining mowing disks 4, 6, 7, 9. This has the advantage that, in this region, large mowing swaths cannot deflect the cutting knives laterally, which would result in a deterioration of the cutting picture.

Figure 3:
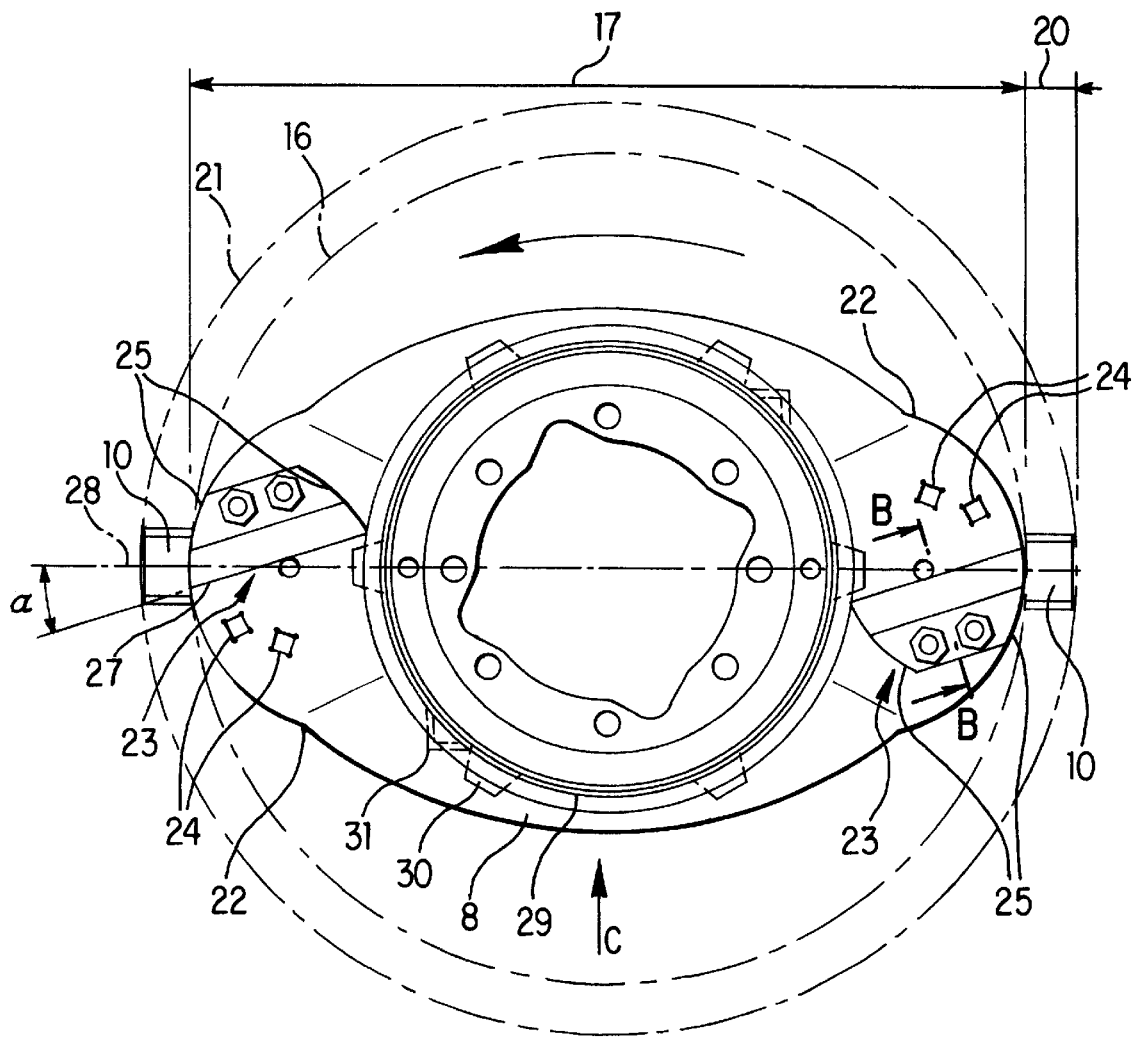
FIG. 3 shows a sectional view taken along the line A—A in FIG. 2 on an enlarged scale.
Figure 4:
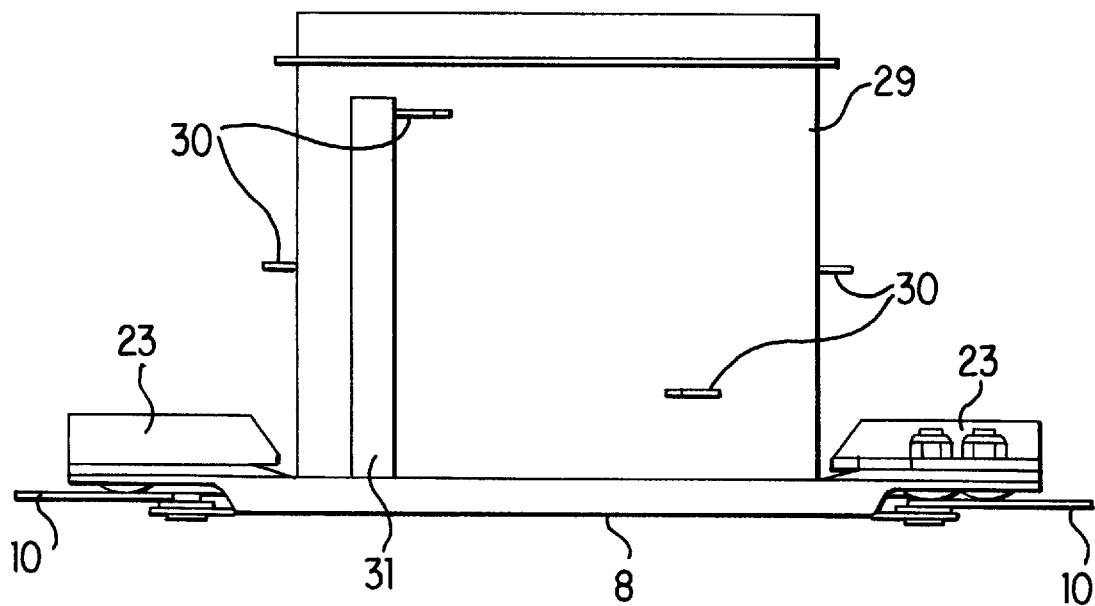
FIG. 4 shows a view looking in the direction of arrow C of FIG. 3.

According to the example, all mowing disks 4, 5, 6, 7, 8, 9 have a basic elliptical shape and the mowing disks 5, 8, which describe an enlarged working circle 16 and are shown, for example, in FIG. 3, have a larger longitudinal extent 17. A conveying element 23 is disposed in the region of this larger longitudinal extent 17 and is connected detachably with the mowing disk 5, 8. By these means, the mowing material is conveyed and, at the same time, raised more intensively. The conveying element 23 is constructed appropriately so that the same element 23 can be used for mowing plates 5 rotating in the clockwise direction as well as for mowing plates 8 rotating in the anti-clockwise direction. For the mutual mounting, additional fastening holes 24 are provided in the mowing disks 5, 8. In the plan view, the outer contour 25 of the conveying element 23 is adapted in shape to the outer contour of the large mowing disk 5, 8 in this region, so that the latter terminates with the outer contour of the mowing disk 5, 8. The outer end point 34 of the leading edge 27 of the conveying element 23 preferably, in the direction of rotation, leads the inner end point 35, in order to intensify the conveying action.

The leading edge 27 of the conveying element forms with the longitudinal axis 28 of the elliptical mowing disk contour an acute angle oa, by means of which the additional conveying of the mowing material is intensified. The leading edge 27 and, with that, the outer end point 34 of the conveying element 23 preferably ends in the width region of the cutting knife 10.

Figure 5:
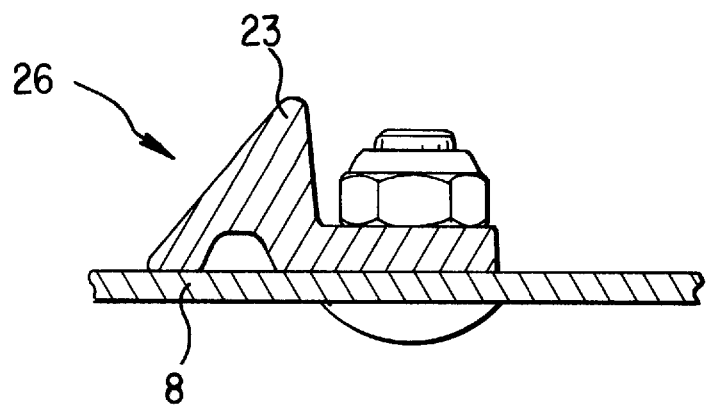
FIG. 5 shows a sectional view taken along the line B—B in FIG. 3 on an enlarged scale.

The conveying element 23, in the direction counter to that of the rotation of the mowing disk 5, 8, has a rising ramp region 26, by means of which the mowing material is conveyed and raised additionally (FIG. 5).

The conveying action of the larger mowing disk 5, 8 with the basic elliptical shape can be increased further in the region of the larger longitudinal extent 17, for example, by disposing notches 22 in the direction of rotation (FIG. 3).

The outer mowing disks 4, 5, 8, 9 of the disk mower are equipped, according to the example, with additional drum-like conveying devices 29 (FIGS. 3; 4), which support the conveying above the cutting plane of the cutting knives 10 and of the mowing plates. Further conveying devices 30, 31 of different shape are disposed distributed on the periphery of these drum-like conveying device 29. They also contribute to conveying the mowing material, particularly in the upper region of the mowing swath that is forming.

So that laterally conveyed mowing material cannot pass in between the mowing disks 4, 5; 8, 9, a transfer device 32, 33, which consists of flexible material in its effective part, is provided pursuant to the invention.

What we claim is:

1. A disk mower moveable in a cutting direction comprising a mower cutter support means, a plurality of mowing disks mounted on said support means, said mowing disks being aligned in a direction generally perpendicular to said cutting direction, each of said mowing disks rotating within a working circle having a working circle diameter, the working circle diameter of at least one of said mowing disks being different from the working circle diameter of at least one other mowing disk at least three of said plurality of mowing disks being disposed on either side of a central plane parallel to said cutting direction, said at least three of said mowing disks disposed on one side of said central plane being designated first, second and third mowing disks with said second moving disk being disposed between said first and second mowing disks, said at least three of said mowing discs disposed on said other side of said central Diane being designated fourth, fifth and sixth moving disks with said fifth moving disk being disposed between said fourth and sixth mowing disk the working disk being disposed between said fourth and sixth mowing disk the working circle diameter of said second and fifth mowing disks being larger than the working circle diameter of said first, third, fourth and sixth mowing disks.

2. A disk mower according to claim 1 further comprising cutting knives mounted on each of said mowing disks, each of said cutting knives having an outer radial end moving in a cutting circle having a cutting circle diameter, the cutting circle diameter of said cutting knives on each of said mowing disks being substantially the same.

3. A disk mower according to claim 1 wherein said at least one mowing disk is designated a first mowing disk, said first mowing disk having a first circle diameter, said at least one other moving disk being designated a second mowing disk, said second mowing disk having a second working circle diameter, said first working circle diameter being less than said second working circle diameter.

4. A disk mower according to claim 3 comprising cutting knives on each of said moving disks, each of said cutting knives having an effective cutting length, the effective cutting length of the cutting knives on said first mowing disk being longer than the effective cutting length of said cutting knives on said second mowing disc.

5. A disk mower according to claim 1 wherein the disk mower includes at least three of said mowing disks including an intermediate mowing disk between two juxtaposed mowing disks, the working circle diameter of said intermediate mowing disk being greater then the working circle diameter of said two juxtaposed mowing disks.

6. A disk mower according to claim 1 wherein said third and fourth mowing disks are juxtaposed to one another.

7. A disk mower according to claim 1 wherein each of said mowing disks having a generally elliptical configuration with a major axis and a minor axis, the length of the major axis of said at least one mowing disk being larger than the length of the major axis of said at least one other mowing disk.

8. A disk mower according to claim 7 wherein said at least one mowing disk is designated a first mowing disk, said first mowing disk having outer end portions disposed at the outer end portions of said major axis, further comprising conveying elements on said outer end portions which convey and raise the mowed material.

9. A disk mower according to claim 8 further comprising detachably connecting means for detachably connecting said conveying elements to said first mowing disk.

10. A disk mower according to claim 8 wherein said conveying elements are mountable on said first disk for operation during clockwise or counter clockwise rotation of said first disk.

11. A disk mower according to claim 8 wherein said conveying elements have an outer radial portion, said first mowing disk having an outer radial section juxtaposed to said outer radial portion of said conveying elements, said outer radial portions of said conveying elements having substantially the same configuration as the respective juxtaposed outer radial sections of said first mowing disk.

12. A disk mower according to claim 8 wherein said conveying elements each have a ramp portion which progressively rises considered in a direction opposite to the direction of rotation of said conveying element.

13. A disk mower according to claim 8 wherein said conveying elements each have a leading edge disposed at an acute angle relative to said major axis.

14. A disk mower according to claim 13 wherein said leading edge of said conveying element has an inner end and an outer end, said outer end leading said inner end in the direction of rotation of said conveying element.

15. A disk mower according to claim 14 wherein said inner end of said conveying element is disposed radially inwardly of said cutting knife.

16. A disk mower moveable in a cutting direction for mowing moving material comprising a mower cutter support means, a plurality of mowing disks mounted on said support means, said mowing disks being aligned in a direction generally perpendicular to said cutting direction, each of said mowing disks rotating within a working circle having a working circle diameter, the working circle diameter of at least one of said mowing disks being different from the working circle diameter of at least one other mowing disk, cutting knives mounted on each of said mowing disks, each of said cutting knives having an outer radial end moving in a cutting circle having a cutting circle diameter, the cutting circle diameter of said cutting knives on each of said mowing disks being substantially the same, said knives cutting along a cutting plane, and a conveying drum means disposed above each mowing disk and above said cutting plane for conveying said mowing material.

17. A disk mower according to claim 16 wherein said plurality of mowing disks include two outer most mowing disks, and a transfer device disposed between the drums and operable with said two outermost mowing disks.

18. A disk mower moveable in a cutting direction, comprising:

a mower cutter support means;

a plurality of mowing disks mounted on said support means, said plurality of mowing disks being aligned in a direction generally perpendicular to said cutting direction and arranged in a first group and a second group each comprised of adjacent ones of said plurality of mowing disks, ones of said plurality of mower disks in said first group rotating in a direction opposite remaining ones of said plurality of mower disks in said second group;

each of said first and second groups including at least three of said mowing disks including an intermediate mowing disk between two iuxtaposed mowing disks, the working circle diameter of said intermediate mowing disk being greater then the working circle diameter of said two juxtaposed mowing disks.

19. A mower disk for use on a disk mower, comprising:

a disk body of elliptical configuration including a longitudinal axis;

a conveying element presenting a leading edge, said conveying element being mountable to said disk body in a fixed position in which an outer end point of said leading edge leads an inner point of said leading edge in an operating direction of rotation of said mower disk.

20. A mower disk according to claim 19, wherein said conveying element further includes a ramp region sloped upward in a direction opposite said operating direction of rotation.

21. A mower disk according to claim 19, wherein when said conveying element is mounted to said disk body in said fixed position, said leading edge forms an acute angle with said longitudinal axis.

22. A mower disk according to claim 19, further comprising:

a cutting knife carried peripherally over a width region on said disk body and extending radially therefrom; and said outer end point of said leading edge of said conveying element when mounted to said disk body in said fixed position being within said width region.

23. A mower disk according to claim 19, wherein said conveying element is bilaterally symmetric about an axis running crosswise said leading edge, opposed edges of said conveying element on either side of said axis being configured to conform to an outer contour of said disc body to permit conformance therewith when mounted in a position corresponding to operation of said mower disk in either of a clockwise and a counterclockwise direction.

24. A mower disk according to claim 19, wherein said disk body includes mounting means for alternative mounting of said conveying element in either of two positions corresponding to clockwise and counterclockwise rotational operation of said mower disk.

* * * * *